3 Sheets—Sheet 1.

E. S. PHELPS.

TIME LOCK.

No. 11,355. Reissued Aug. 8, 1893.

Attest:
F. H. Schott
Alfred T. Gage.

Inventor:
Edwin S. Phelps
by R. E. Anderson,
Attorney.

3 Sheets—Sheet 2.
E. S. PHELPS.
TIME LOCK.
No. 11,355. Reissued Aug. 8, 1893.
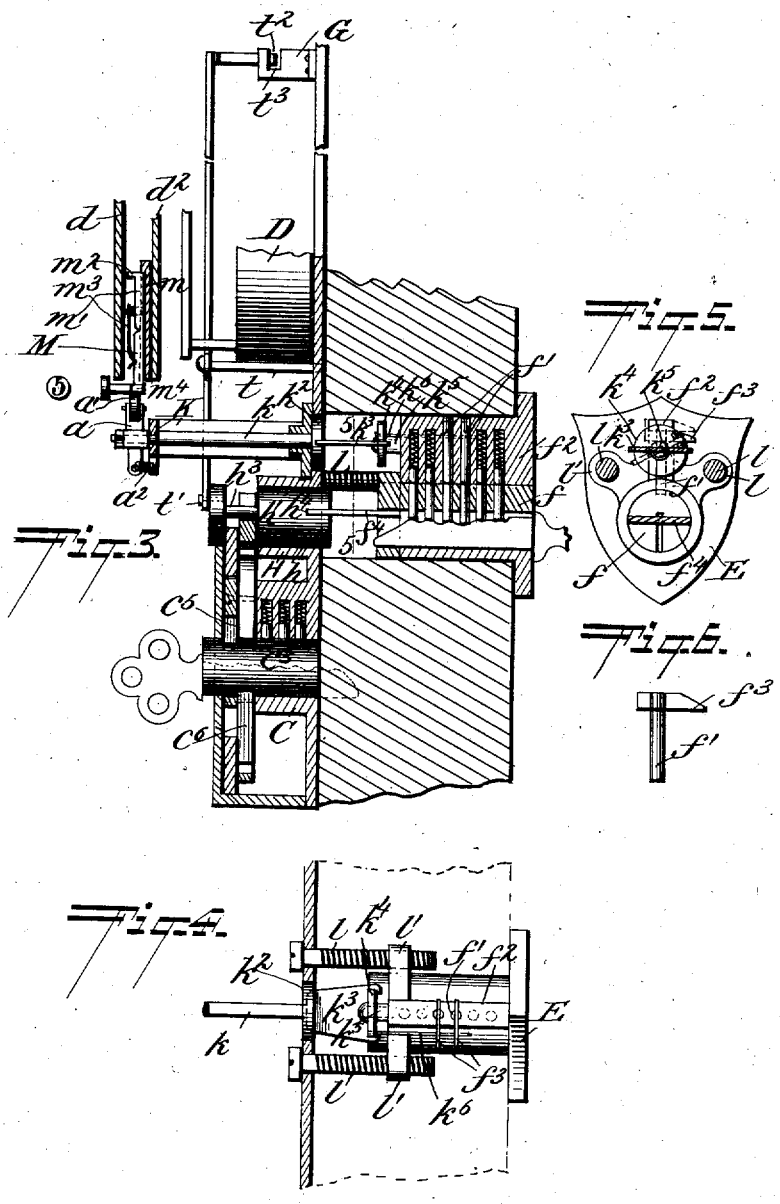
Attest:
F. H. Schott
Alfred V. Gage.
Inventor:
Edwin S. Phelps,
by W. E. Heidemann
Attorney.

E. S. PHELPS.
TIME LOCK.
No. 11,355. Reissued Aug. 8, 1893.
Fig. 7.
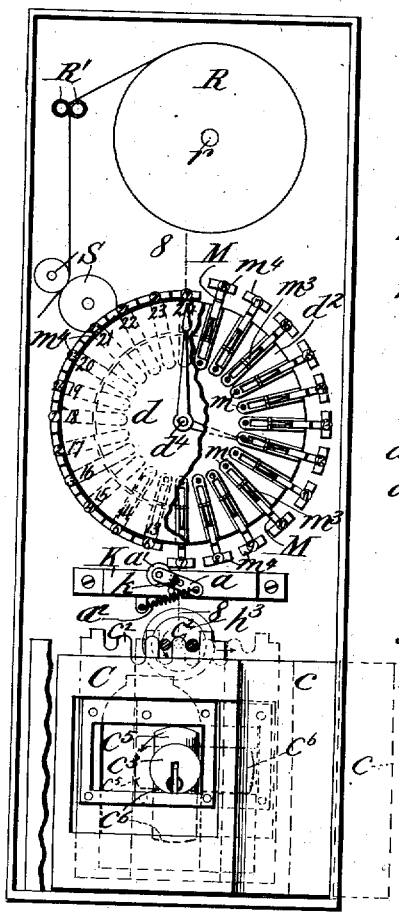
Fig. 8.
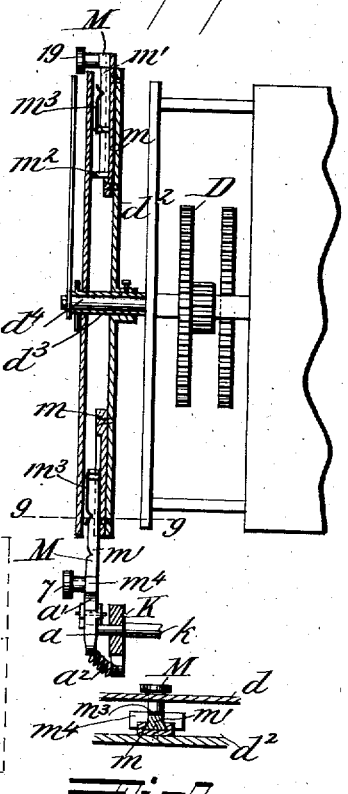
Fig. 9.
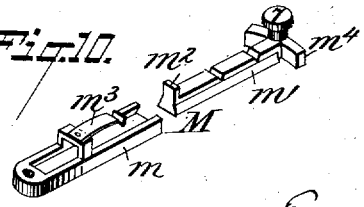
Fig. 10.
Attest:
F. H. Schott
Alfred T. Gage
Inventor:
Edwin S. Phelps,
by R. E. Blackman,
Attorney

UNITED STATES PATENT OFFICE.

EDWIN S. PHELPS, OF LEAVENWORTH, KANSAS.

TIME-LOCK.

SPECIFICATION forming part of Reissued Letters Patent No. 11,355, dated August 8, 1893.

Original No. 486,603, dated November 22, 1892. Application for reissue filed April 19, 1893. Serial No. 471,043.

*To all whom it may concern:*

Be it known that I, EDWIN SANFORD PHELPS, a citizen of the United States, residing at Leavenworth, in the county of Leavenworth and State of Kansas, have invented certain new and useful Improvements in Time-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in time-locks such as are applied to doors of stores, offices, banks, safes, &c.; and it has for its object the construction of such a device whereby the doors with which it is used can be locked in such a manner that only during a certain predetermined time it can be unlocked by a certain key entrusted to a subordinate, for instance, and which can also be unlocked at any time by a different or master key carried by the principal.

This invention has further for its object the provision of a time mechanism that can be applied to any lock provided with tumblers or dogs whereby the above named objects may be secured, and also the provision of such mechanism that is of simple construction and application and which is efficient in its purpose.

The invention also has for its object the provision of means whereby it can be ascertained at what time or times the door may have been unlocked from the exterior.

The invention consists in the novel construction, combination, and arrangement of parts such as will be hereinafter fully described, pointed out in the appended claims, and illustrated in the accompanying drawings.

Figure 1:
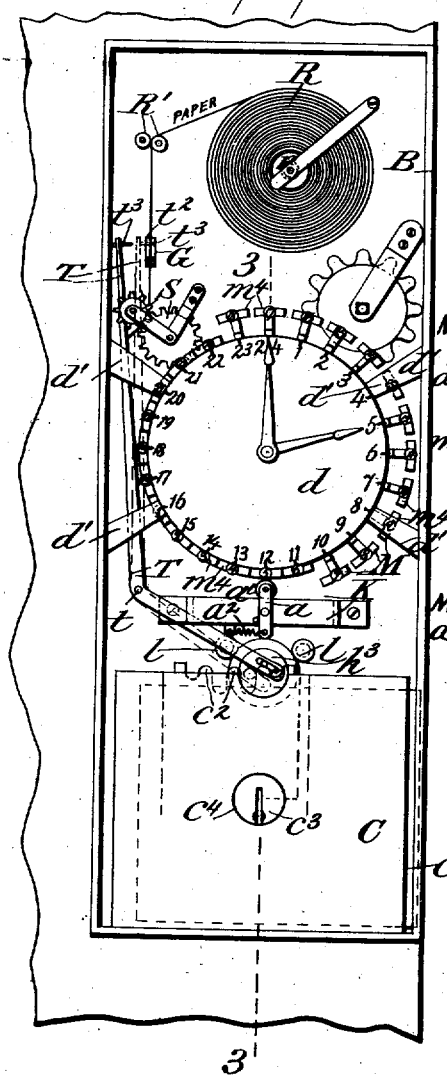
Figure 2:
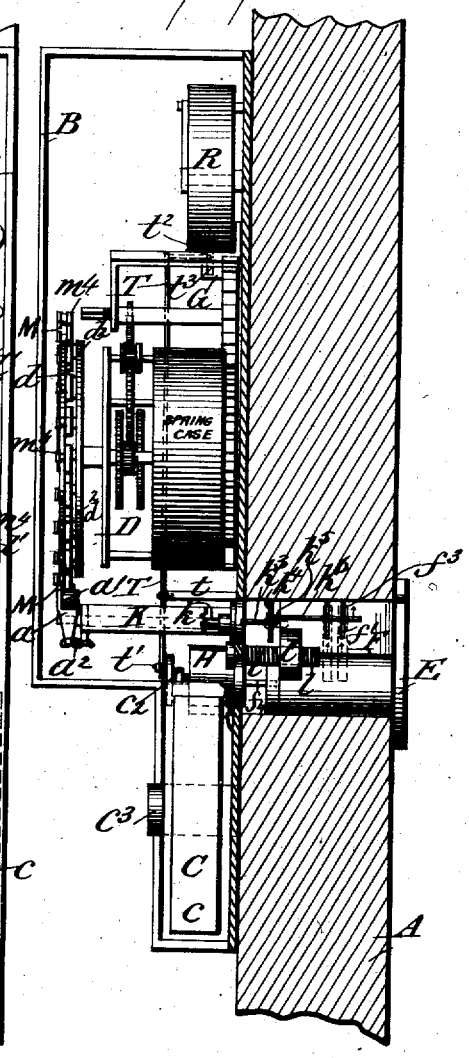

In the accompanying drawings, in which similar letters of reference designate corresponding parts, Figure 1 is a front elevation of a locking mechanism embodying the invention, the front of the casing being removed. Fig. 2 is a side elevation of the same, the side piece of the casing being removed. Fig. 3 is an enlarged detail view showing a cross section on the line 3—3 of Fig. 1. Fig. 4 is a similar view showing a plan view of the casing for the outer key-hub and its adjunctive parts. Fig. 5 is a similar view showing a rear elevation of the casing carrying the outer key hub and several of the parts connected therewith. Fig. 6 is a detail view showing one of the movable tumblers carried by the outer key-hub casing. Fig. 7 is a detail view showing a front elevation, illustrating the two dials, the outer of which is partly broken away, and the lock proper, the casing of the latter being removed. Fig. 8 is an enlarged detail view showing a section on the line 8—8 of Fig. 7. Fig. 9 is a detail view showing a section taken through the line 9—9 of Fig. 8, and Fig. 10 is a detail perspective view showing one of the extension arms.

Referring to the drawings, A designates the door; B, the main casing, which carries the several different parts of the lock; C, the lock proper, and D the clock mechanism.

E designates the escutcheon secured to the outer face of the door and has secured to its back the casing F, which carries the key-hub, through which the bolt of the lock proper can be operated from the outer side of the door.

The lock C is secured to a part of the main casing B, and it consists, primarily, of a bolt $c$, suitably recessed in its inner side for the reception of the dog $c'$, which has a rack $c^2$ formed on its upper edge. The latter normally extends above the surrounding casing. The key-hub $c^3$ is seated in a socket $c^4$ and is provided with usual tumblers and the arms $c^5$ and $c^6$. By means of the said arms the hub will when rotated move the bolt $c$ and depress the dog $c'$ during such movement. The dog being held normally by the arm $c^5$ in engagement with the lantern gear $h^3$, the dog cannot be moved until the dog is released from such engagement, which is accomplished by its depression by the said arm. By means of the hub $c^3$ the lock can be operated at any time from the interior.

The main plate of the casing B is perforated at $h$, immediately above the lock C, and has secured thereto so that it will register with the said opening the sleeve H, in which is journaled the spindle $h'$, provided with a suitable provision against longitudinal movement, but which will not interfere with its free rotation. To the front end of this spindle the lantern gear $h^3$ is attached and which meshes with the rack $c^2$ of the dog $c'$ and will through such connection on the rotation of the spindle move the bolt $c$ to lock or unlock the door. The rear end of the spindle is diametrically slotted at $h^4$.

To the back of the main plate of the casing B the casing F is adjustably secured by the screws $l$ $l$, passing through the main plate and engaging with the threaded lugs $l'$ $l'$ of the casing. Their adjustable connection allows the lock to be fitted to any door, whatever its thickness might be. The front end of the casing F has secured to it or made integral with it the escutcheon E. In the casing is journaled the key-hub $f$, suitably slotted for the reception of a key and it is secured against turning by other than the proper key by the tumblers $f'$ $f'$, the upper ones of which are seated in the extension $f^2$ and the lower ones in the hub. Two of the upper tumblers are replaced by the tumblers shown in Fig. 6 which are the ordinary tumblers extended and provided at their upper ends with extensions or lugs $f^3$ $f^3$, the sides of the extension being slotted to receive the said lugs. The purpose of these peculiarly constructed tumblers will be explained hereinafter. The inner end of the key hub is provided with a diametrical slot, in which and the slot $h^4$ in the end of the spindle $h'$ the ends of the plate $f^4$ are respectively seated. Through this connection any rotation of the key hub $f$ by a proper key will be communicated to the spindle $h'$ and the lantern gear $h^3$, which, meshing with the rack of the dog $c'$, will move the bolt $c$ to lock or unlock the door, as the case may be.

The key-hub $f$ is provided with two different keys, one of which will when inserted adjust all the tumblers to allow the turning of the hub, except those which are provided with projecting lugs $f^3$ $f^3$, and consequently cannot turn the spindle so long as these tumblers are in the way. An automatic time mechanism which will be described farther on, is provided however, which will during a certain predetermined period of time raise the said interfering tumblers and allow the key to turn the hub, which it cannot do outside of such period, as the tumblers are then lowered into position and the hub cannot be turned except by another key which will make the proper adjustment of all the tumblers. This second key will also turn the hub while the dogs or tumblers are elevated.

The purposes to which a lock constructed so that a certain key will operate the lock only during a certain period of time and a second key will operate it at all times are obvious and need not herein be again set forth.

The mechanism which automatically raises and lowers the tumblers of the outer key hub will now be described.

The clock mechanism D, secured to the upper part of the main plate of the casing B, is that which is ordinarily used in twenty-four hour clocks. The stationary dial-plate $d$ is supported in any suitable manner, in the present instance being shown as supported by the bracket $d'$ $d'$, attached to the casing. The hours, one to twenty-four, inclusive, are indicated on its face. Beneath the fixed dial a moving dial $d^2$ of the same diameter as the former is mounted. The moving dial consists of the metallic plate $d^2$ mounted on the sleeve $d^3$, journaled on the shaft $d^4$, and which carries the hour hand, so as to be rotated with the same. On the face of this plate, near its edge are radially arranged the expansion arms M, twenty-four in number and equidistant apart. Each of these arms is formed of a shank $m$, secured to the plate, and the movable portion $m'$, dovetailed to the shank, so that it can be readily moved radially. Any other connection which will allow the radial movement of the portion $m'$ can be used without departing from the spirit of the invention. To limit the movement of the portion $m'$, its inner end is provided with a stop $m^2$ which will come in contact with stops suitably placed upon the dial. The spring $m^3$ is provided which will by engaging with the notches in the extensible portion $m'$ serve to hold the said part in its adjusted position. The outer end of each of the extension arms has secured thereto a segmental piece $m^4$ which is so formed that it will project slightly above the fixed dial plate and is of such a length that it will not interfere with the movement of its neighbors. These extension arms are numbered consecutively from "1" to "24," inclusive, and they are so arranged that number "12" will be directly under the hour hand. The object of these extension arms is to press upon a lever or arm $a$ which will through intermediate mechanism, hereinafter explained, elevate the two tumblers $f^3$ $f^3$. For an instance, suppose that a merchant should desire to have the lock of his store so adjusted as to allow the porter to whom the key is entrusted which will only operate the key-hub while the said tumblers are raised, to use his key between the hours of seven o'clock a. m. and six o'clock p. m. Before going home at night he draws out all the extension arms $m$ numbered "7" to "18," inclusive. The arms so arranged will press upon the arm $a$ for the time mentioned, and through the intermediate mechanism uphold the tumblers $f^3$ $f^3$. As each of the segments will control the tumblers for an hour each, they may be so arranged as to operate at any desired number of intervals. The number of the arms may be increased to forty-eight, or several of them may be replaced by two each, so that the hours may be split if necessary. As such a change would not involve any essential change in the principle, they need not be more specifically described.

The intermediate mechanism connecting the moving dial with the tumblers $f^3$ $f^3$ of the key hub will now be described.

K designates a frame attached to the main plate of the casing immediately below the clock mechanism and has journaled in it the outer end of the shaft $k$ the inner end of the latter having secured thereon the disk $k^2$, which is journaled in a suitable bearing formed in the main plate. The outer face of the disk is provided with a diametrical slot, with which the end of the plate $k^3$ registers. The outer end of the plate is bifurcated and engages with the notched periphery of the plate $k^4$, rotatably mounted on the pin $k^5$ screwed into the extension $f^2$ of the casing F. Attached to the plate $k^4$ near its edge is an arm $k^6$, which extends under the projections of the tumblers $f^3$ $f^3$. On the outer end of the shaft $k$ is secured the arm $a$, provided with a friction roller $a'$ on one end. A spiral spring $a^2$ connects the other end of the arm with the frame K and serves to hold the arm in an upright position, so that if the arms M should be extended they would bear against the friction roller and incline the arm to the left.

R designates a roll of paper or tape carried by the shaft $r$.

S S are feed rollers, formed of rubber or other suitable material, driven at a uniform rate of speed by suitable connections with the clock mechanism, and serve to draw the graduated tape between the guides G G.

R′ R′ are guide rolls which serve to support the paper in its course. As the paper is withdrawn from the roll, it is deposited in a suitable receptacle to which access is had only by a person in authority.

T designates a lever pivoted on the shaft $t$ and provided with a slot in its lower end, which registers with a pin $t'$, projecting eccentrically from the lantern gear $h^3$, so that if the latter should be turned to unlock the door from the exterior the upper end of the lever would be moved in such a manner that the punch $t^2$ secured to its upper end, would perforate the paper as it passed the slots $t^3$ $t^3$ in the guides G G. By this means it could always be ascertained by an examination of the graduated tape at what hours the door may have been unlocked from the exterior.

It might be well to observe that the arrangement of the tumblers guarding the key-hub $f$ is not arbitrary, and any other obvious arrangement may be made without departing from the spirit of the invention, and, also, that the plates may be made to fit a door of any width.

Having described my invention, what I claim, and desire to secure by Letters Patent, is—

1. The combination with the tumblers or dogs of a lock, of a clock mechanism for moving one or more of the tumblers or dogs to allow the use of different keys during different periods of time, substantially as described.

2. In a device of the class described, the combination of a key hub guarded by tumblers with a clock mechanism for raising one or more of said tumblers to allow the use of different keys during the different periods of time and the bolt operated by the said hub, substantially as described.

3. In a locking device the combination of a key hub guarded by tumblers, the bolt operated by the said hub, the moving dial, the extension arms carried by the said dial, and the intermediate mechanism connecting the said arms with the said tumblers, substantially as described.

4. In a locking device, the combination with tumblers or dogs, of a moving dial, extension arms carried by the said dial, and intermediate mechanism connecting the said arms with one or more of said tumblers or dogs, substantially as described.

5. In a locking device the combination of the key hub guarded by tumblers, the bolt operated by the said hub, the clock mechanism for raising or lowering one or more of the said tumblers and the recording mechanism to register the turning of the said hub, substantially as described.

6. In a locking device the combination with the tumblers or dogs and a bolt, of mechanism for moving one or more of the tumblers or dogs, and recording mechanism to register the movement of the bolt, substantially as described.

7. In a locking device the combination with mechanism permitting the unlocking of the device at a predetermined time by the use of one key and its unlocking at any time by a master key, of a registering device recording the time when the device is unlocked, substantially as described.

8. In a locking device the combination with a bolt and tumblers or dogs which must be operated to permit the movement of the bolt, of a time mechanism and registering mechanism for recording and indicating the time when the bolt is moved, substantially as described.

9. In a locking device the combination of the casing, the key-hub journaled therein, the bolt operated by the said hub, the tumblers seated in the said casing, the arm engaging with one or more of the said tumblers, and the mechanism for moving the said arm to raise or lower the said tumbler or tumblers, substantially as described.

10. In a locking device the combination of the casing, the key-hub journaled therein, the bolt operated by the said hub, the tumblers seated in the said casing to lock the hub relatively thereto, the rotatable disk mounted on the casing, the arm carried by the disk and engaging with one or more of the said tumblers, the shaft connected with the said disk, the arm attached to the front end of the said shaft, the moving dial plate, the extension arms secured thereon and adapted to bear against when extended the arm connected with the shaft, substantially as described.

11. In a locking device the combination of the casing, the key-hub journaled therein, the bolt operated by the said hub, the tumblers seated in the said casing to lock the hub relatively thereto, the disk rotatably mounted on the casing, the arm carried by the disk and engaging with one or more of the said tumblers, the shaft connected with the said disk, mechanism for partly rotating the said shaft, the segment mounted on the said shaft, having cam faces, and the spring adapted to press upon the cam, substantially as described.

12. In a locking device the combination of the lock proper consisting, essentially, of a bolt and a dog for moving the same, the said dog having a rack formed on its upper edge, and the rotatable lantern gear meshing with the said rack, substantially as described.

13. In a locking device the combination of the lock proper consisting, essentially, of a bolt and a dog for moving the latter, the said dog having a rack formed on its upper edge, the lantern gear meshing with the said rack, the key-hub, and the shaft connecting the said hub with the lantern gear, substantially as described.

14. In a locking device, the combination of the lock proper consisting essentially, of a bolt and a dog for moving the latter, the said dog having a rack formed on its upper edge, the rotatable lantern gear meshing with the said rack, the key-hub provided with arms to operate the said dog to disengage it from the lantern gear, substantially as described.

15. In a locking device the combination of the lock proper consisting, essentially, of a bolt and a dog for moving the same, the said dog having a rack formed on its upper edge, the lantern gear meshing with the said rack, the key hub, the shaft carrying the said lantern gear, the inner ends of the said shaft and key hub having diametrical slots, and the plate with its ends seated in the said slots, substantially as described.

16. In a locking device, the combination of the lantern gear, adapted to be rotated by the key-hub, the pin eccentrically mounted on the outer end thereof, the lever engaging with the said pin at its lower end and having a punch attached to its upper end, the tape roll, the guide, and the guide rolls, substantially as described.

EDWIN S. PHELPS.

Witnesses:
W. R. PAGE,
SAMUEL T. CARTER, Jr.